United States Patent [19]

Takachi et al.

[11] Patent Number: 5,728,788
[45] Date of Patent: Mar. 17, 1998

[54] PROCESS OF PRODUCING VINYL ACETATE POLYMER

[75] Inventors: Hiroshi Takachi, Okayama; Kazuyori Yoshimi, Kurashiki, both of Japan

[73] Assignee: Kuraray Co., Ltd., Okayama, Japan

[21] Appl. No.: 814,710

[22] Filed: Mar. 11, 1997

[30] Foreign Application Priority Data

Mar. 29, 1996 [JP] Japan .................. 8-077829

[51] Int. Cl.$^6$ .................................................. C08F 2/00
[52] U.S. Cl. ................................... 526/216; 526/330
[58] Field of Search ........................................ 526/216

[56] References Cited

U.S. PATENT DOCUMENTS

| 3,193,542 | 7/1965 | Kurashiki et al. ............ 525/62 |
| 3,607,852 | 9/1971 | Eichhorn et al. ............. 526/212 |

FOREIGN PATENT DOCUMENTS

| 1720806 | 7/1971 | Germany . |
| 36-16446 | 9/1961 | Japan . |
| 37-10590 | 8/1962 | Japan . |
| 45-13104 | 5/1970 | Japan .................. 526/216 |
| 53-112989 | 10/1978 | Japan .................. 526/216 |
| 58-222102 | 12/1983 | Japan . |
| 4-213302 | 8/1992 | Japan . |
| 0589337 | 6/1947 | United Kingdom ............ 526/216 |
| 1097613 | 1/1968 | United Kingdom ............ 526/216 |
| 1176178 | 1/1970 | United Kingdom ............ 526/216 |

OTHER PUBLICATIONS

Derwent Abstract of JP 51 011 888 (Abstract AN 76-19747X), Oct. 30, 1976.

*Primary Examiner*—Joseph L. Schofer
*Assistant Examiner*—N. Sarofim

[57] ABSTRACT

The present invention provides a process of producing a vinyl acetate polymer by homopolymerization of a vinyl acetate monomer or copolymerization of a vinyl acetate monomer and another copolymerizable comonomer, wherein a polymerization initiator is an organic peroxide having a half life at 60° C. of 10 to 110 minutes, and a polymerization liquid contains at least one carboxylic acid or its salt, said carboxylic acid being selected from the group consisting of a hydroxycarboxylic acid and a polycarboxylic acid. According to the process of producing a vinyl acetate polymer of the present invention, the amount of soluble matters is decreased in a waste liquid generated by saponification of the vinyl acetate polymer, the amount of insoluble matters is decreased in a solvent for preparing a solution of the vinyl alcohol polymer obtained by saponification of the vinyl acetate polymer, the transparency of the solution of the vinyl alcohol polymer obtained by saponification of the vinyl acetate polymer is improved, and the odor of the vinyl alcohol polymer obtained by saponification of the vinyl acetate polymer is decreased.

3 Claims, No Drawings

PROCESS OF PRODUCING VINYL ACETATE POLYMER

FIELD OF THE INVENTION

The present invention relates to a process of producing a vinyl acetate polymer (hereinafter referred to as "PVAc", which includes a copolymer) by homopolymerization of a vinyl acetate monomer (hereinafter referred to as "VAc") or copolymerization of VAc and another comonomer copolymerizable with VAc.

RELATED ART

Hitherto, a solution polymerization, a bulk polymerization, a suspension polymerization, an emulsion polymerization and the like are known as a process of polymerizing VAc. A persulfate salt such as potassium persulfate, an azo compound such as azobisisobutyronitrile and an organic peroxide such as bonzoyl peroxide are typically used as a polymerization initiator for the polymerization.

PVAc obtained by the polymerization of VAc is converted by saponification to polyvinyl alcohol (hereinafter referred to as "PVA", which includes a copolymer) which is industrially useful.

Japanese Patent Kokai Publication No. Heisei 4-213302 (hereinafter referred to as "known item A") discloses a specified organic peroxide which is used as a polymerization initiator.

Japanese Patent Kokai Publication No. Showa 58-222102 (hereinafter referred to as "known item B") discloses that saponification of a copolymer obtained by copolymerizing ethylene and VAc by using a radical initiator having a half life at 60° C. of at most 2 hours and a polymerization solvent of methanol or tert-butyl alcohol gives a film having excellent surface properties.

Japanese Patent Kokoku Publication No. Showa 37-10590 (hereinafter referred to as "known item C") discloses that saponification of PVAc obtained by solution-polymerizing VAc in the presence of a specified organic acid or its salt gives PVA having excellent whiteness.

Japanese Patent Kokoku Publication No. Showa 36-16446 (hereinafter referred to as "known item D") discloses that saponification of PVAc obtained by solution-polymerizing VAc in the presence of a specified organic acid reduces the decrease of degree of polymerization of PVA.

However, when PVAc produced by the conventional polymerization process disclosed in the known items A–D is saponified, a waste liquid generated by saponification contains a large amount of soluble matters so that there have been caused problems such as the environmental pollution, the clogging of a filter in treatment of waste liquid and the increase of treatment cost.

Frequently, PVA is usually dissolved in a solvent such as water and is used in the form of a solution. However, PVA obtained by the conventional process has problems that the insoluble matters in a solvent such as water are increased and that the transparency of the solution is decreased when an aqueous solution is used. In addition, PVA obtained by using the persulfate salt, the azo compound or the organic peroxide as the polymerization initiator has the problem that odor is evolved, for example, when PVA is heated.

SUMMARY OF THE INVENTION

The object of the present invention is to provide a process of producing PVAc which gives the following effects; the amount of soluble matters is decreased in a waste liquid generated by saponification of PVAc, the amount of insoluble matters is decreased in a solvent for preparing a solution of PVA obtained by saponification of PVAc, the transparency of the solution of PVA obtained by saponification of PVAc is improved, and the odor of PVA obtained by saponification of PVAc is decreased.

The present inventors intensively studied to solve the above problems and completed the present invention by finding a process of producing a vinyl acetate polymer by homopolymerization of a vinyl acetate monomer or copolymerization of a vinyl acetate monomer and another copolymerizable comonomer, wherein a polymerization initiator is an organic peroxide having a half life at 60° C. of 10 to 110 minutes, and a polymerization liquid contains at least one carboxylic acid or its salt, said carboxylic acid being selected from the group consisting of a hydroxycarboxylic acid and a polycarboxylic acid.

DETAILED DESCRIPTION OF THE INVENTION

The monomer used in the present invention includes VAc, and another comonomer copolymerizable with VAc. It is preferable to decrease the amount of the another copolymerizable comonomer and it is particularly preferable to use VAc alone.

Specific examples of the another comonomer copolymerizable with VAc are a nonionic monomer, for example, an olefin such as ethylene and propylene, a hydroxyolefin such as 7-octen-1-ol, a (meth)acrylate ester such as methyl (meth)acrylate, ethyl (meth)acrylate, butyl (meth)acrylate, octyl (meth)acrylate, 2-ethylhexyl (meth)acrylate, an allyl compound such as allyl acetate and allyl chloride, (meth)acrylonitrile, and vinyltrimethoxysilane; an anionic monomer such as itaconic acid, maleic acid, maleic anhydride, (meth)acrylic acid, fumaric acid, crotonic acid and (meth)allylsulfonic acid; and a cationic monomer such as 3-(meth)acrylamido-propyltrimethylammonium chloride.

The degree of polymerization of the PVAc obtained by the present invention is preferably from 50 to 30,000, more preferably from 100 to 20,000, particularly from 200 to 5,000. The degree of polymerization referred to in the present invention means a viscosity-average degree of polymerization of PVA obtained by saponification of PVAc. A fully saponified product and a partially saponified product are obtained from PVAc obtained by the present invention. The degree of saponification of PVA is preferably at least 60 mol %, more preferably from 70 to 99.9 mol %.

The polymerization initiator used in the present invention is an organic peroxide having a half life at 60° C. of 10 minutes to 110 minutes. The half life of the organic peroxide is preferably from 15 minutes to 100 minutes, more preferably from 20 minutes to 80 minutes.

Specific examples of the organic peroxide are isobutyl peroxide (IBP), di-isopropyl peroxydicarbonate (IPPDC), di-allyl peroxydicarbonate (APDC), di-n-propyl peroxydicarbonate (NPPDC), di-miristyl peroxydicarbonate (MSPDC), di(2-ethoxyethyl) peroxydicarbonate (EEPDC), di(2-ethylhexyl) peroxydicarbonate (EHPDC) and di(methoxyisopropyl) peroxydicarbonate (MIPPDC). Among them, the peroxydicarbonates are particularly preferable. Hereinafter, a name of the organic peroxide is indicated by the above abbreviation in parenthesis.

A method of using the organic peroxide is preferably a method of diluting the organic peroxide with a suitable solvent and supply it to a polymerization vessel in view of the prevention of activation decrease of the organic peroxide, and the establishment of polymerization stability and handling safety. Specific examples of the solvent for dilution are a lower aliphatic alcohol such as methanol, an aliphatic hydrocarbon such as isoparaffin, an aromatic compound such as dimethyl phthalate, and a mixture thereof. In the case of IBP, IPPDC, APDC, EEPDC, EHPDC and the like, the aliphatic hydrocarbon such as isoparaffin is preferable. In the case of NPPDC, MSPDC, MIPPDC, EHPDC and the like, the lower aliphatic alcohol such as methanol is preferable.

The supply amount of the organic peroxide is preferably from $1\times10^{-3}$ to $1\times10^{-7}$ mol, more preferably from $5\times10^{-4}$ to $1\times10^{-6}$ mol, per 1 mol of the monomer (the total amount of the monomers in the case of the copolymer).

If the supply amount of the organic peroxides is larger than the above upper limit, there may be the possibility that insoluble matters in the solvent for PVA are increased and that odor of PVA is increased. If the supply amount of the organic peroxide is smaller than the above lower limit, there may be the possibility that the fluctuation of a polymerization conversion is increased so that a stable continuous production is difficult.

Specific examples of the hydroxycarboxylic acid and polycarboxylic acid used in the present invention are glycolic acid, lactic acid, glyceric acid, malic acid, tartaric acid, citric acid, salicylic acid, malonic acid, succinic acid, maleic acid, phthalic acid, oxalic acid, glutaric acid and the like. Among them, the saturated aliphatic hydroxycarboxylic acid is preferable and the saturated aliphatic hydroxypolycarboxylic acid is particularly preferable.

The above carboxylic acid may be in the form of a salt, which may be an alkaline metal salt, an alkaline earth metal salt, an ammonium salt and the like. In the case of the polycarboxylic acid, the salt may be one in which part of carboxyl groups are salified or one in which all of carboxyl groups are salified. However, a carboxylic acid with no salt (namely, a free carboxylic acid) is particularly preferable in the present invention.

The supply amount of the carboxylic acid is preferably from 1 ppm to 500 ppm, more preferably from 3 ppm to 300 ppm, most preferably from 5 ppm to 200 ppm, based on the weight of VAc.

A method of supplying the carboxylic acid includes a method of supplying the carboxylic acid alone to a polymerization vessel, a method of supplying a solution of the carboxylic acid to a polymerization vessel, a method of previously adding the carboxylic acid to the monomer such as vinyl acetate before polymerization, a method of supplying the carboxylic acid together with the polymerization initiator to a polymerization vessel, and a combination of the above methods.

A batch polymerization process gives a good effect of the present invention, but a continuous polymerization process, particularly a continuous solution polymerization process exhibits gives the best effect.

PREFERRED EMBODIMENT OF THE INVENTION

The present invention will be illustrated in detail by the following Examples. In the following Examples, "%" stands for "% by weight", unless specified.

A Method of Measuring a Half Life of a Polymerization Initiator

A solution of a polymerization initiator having the concentration of 0.05 to 0.1 mol/liter (mol/L) is prepared by using a solvent inert to the polymerization initiator such as benzene and poured into a glass tube. The atmosphere of the tube is replaced with a nitrogen gas and the tube is immersed in a temperature-controlled bath adjusted to 60° C. After a given time, the concentration of the polymerization initiator is measured by a known method. The time at which the concentration of the polymerization initiator is a half of an initial concentration is determined as a half life from a passing of time and the polymerization initiator concentration.

A known method is suitably adopted as a quantitative analysis of the polymerization initiator. For example, the following method can be exemplified as the quantitative analysis of the polymerization initiator.

A Quantitative Analysis of an Organic Peroxide

In a flask, 30 milliliters (mL) of isopropyl alcohol, 2 mL of glacial acetic acid and 2 mL of a saturated solution of potassium iodide, based on about 0.5 g of a sample (an organic peroxide) are charged in this order, and then the weighed sample (organic peroxide) is charged. A reflux condenser is attached to the flask and then the mixture is gently boiled on a hot plate for 3 minutes. Immediately after the reflux condenser is removed from the flask, sodium thiosulfate is titrated till the disappearance of color of iodine and the amount of the organic peroxide is calculated from the titration amount thereof.

The effect of the present invention was evaluated according to the following methods.

(1) Soluble Matters in Waste Liquid Generated by Saponification

A waste liquid generated by saponification of PVAc is evaporated to dryness at a temperature of 100° C. and the weight of a residue is measured. The weight of the residue is converted to percentage per a unit weight of PVA obtained by saponification of PVAc.

(2) Insoluble Matters in Solvent for PVA

PVA is added to a solvent to give a concentration of 10% and a dissolution operation is conducted at 90° C. for one hour. The resultant solution is filtered with a metal net of 250 mesh, and the weight of insoluble matters left on the net is measured. The weight of the insoluble matters is converted to ppm per the unit weight of PVA.

When PVA is water-soluble, water is used as the solvent. When PVA is water-insoluble or poorly water-soluble, a good solvent (for example, dimethylsulfoxide, water/isopropyl alcohol mixture solvent) is suitably selected.

(3) Transparency of PVA Solution

Transparency of the PVA solution having the concentration of 10% which is obtained in the above item (2) is measured at a temperature of 20° C. by a D-type photoelectric tube colorimeter manufactured by Shimadzu Corp.

(4) Odor of PVA

PVA (20 grams) is charged in a glass test tube (internal diameter: 4 cm, height: 11 cm). The tube is sealed and heated in water bath at 95° C. for 3 hours. Immediately after the tube is cooled to 20° C. and opened, the strength of odor evolved in the tube is sensually evaluated. The evaluation results are indicated by the following symbols:

OO: Very weak odor and excellent
O: Weak odor and good
Δ: Strong odor and poor
X: Very strong odor and very poor

EXAMPLE 1

VAc was continuously polymerized in a 10 L polymerization vessel having a cooling coil in an internal part and equipped with a four-blade paddle stirrer by using di-isopropyl peroxydicarbonate (IPPDC) as a polymerization initiator and lactic acid as a hydroxycarboxylic acid, under the following conditions.

| | |
|---|---|
| Supply amount of VAc | 1,000 g/hr |
| Supply amount of 0.04% solution of lactic acid in methanol | 50 g/hr |
| Supply amount of 0.08% solution of IPPDC in methanol | 50 g/hr |
| Supply amount of methanol | 150 g/hr |
| Polymerization temperature | 60°C. |
| Average residence time | 5 hr |

Then, the obtained polymerization solution was fed to a middle portion of a purge column, a methanol vapor was supplied to a bottom of said column and the unreacted VAc is purged from a top of said column to give a solution of PVAc in methanol.

Sodium hydroxide was added to the obtained solution of PVAc in methanol. The solution was saponified at 40° C. and dried at 120° C. for 2 hours to give PVA having a degree of polymerization of 1,700 and a degree of saponification of 98.5 mol %. The evaluation results are shown in Table 1.

EXAMPLES 2 to 11 AND COMPARATIVE
EXAMPLES 1 to 7

PVAc was obtained by polymerizing VAc in the same manner as in Example 1, except that a polymerization initiator and an acid shown in Table 1 or 2 were used. Then, a solution of PVAc in methanol was prepared and saponified to give PVA. The evaluation results are shown in Tables 1 and 2.

TABLE 1

| | Polymerization Initiator | | | Evaluation results | | | |
|---|---|---|---|---|---|---|---|
| | | | | Soluble matters in waste liquid (%) | Insoluble matters in solvent for PVA (ppm) | Transparency of PVA solution (%) | |
| Example No. | Type | Half life (min.) | Acid | | | | Odor |
| 1 | IPPDC | 35 | Lactic acid | 0.2 | 40 | 96 | ○ |
| 2 | MSPDC | 52 | Oxalic acid | 0.3 | 50 | 97 | ○ |
| 3 | IPPDC | 35 | Tartaric acid | 0.1 | 30 | 98 | ○○ |
| 4 | NPPDC | 44 | Citric acid | 0.1 | 25 | 98 | ○○ |
| 5 | NPPDC | 44 | Lactic acid | 0.2 | 40 | 96 | ○ |
| 6 | IPPDC | 35 | mono-sodium malate | 0.3 | 55 | 96 | ○ |
| 7 | EHPDC | 51 | Tartaric acid | 0.1 | 30 | 98 | ○○ |
| 8 | EEPDC | 45 | Oxalic acid | 0.3 | 40 | 96 | ○ |
| 9 | MIPPDC | 45 | Citric acid | 0.1 | 35 | 98 | ○○ |
| 10 | EHPDC | 51 | Mono-potassium tartrate | 0.3 | 45 | 96 | ○ |
| 11 | EHPDC | 51 | Di-potassium tartrate | 0.4 | 55 | 95 | ○ |

TABLE 2

| | Polymerization Initiator | | | Evaluation results | | | |
|---|---|---|---|---|---|---|---|
| | | | | Soluble matters in waste liquid (%) | Insoluble matters in solvent for PVA (ppm) | Transparency of PVA solution (%) | |
| Comparative Example No. | Type | Half life | Acid | | | | Odor |
| 1 | MSPDC | 52 min. | None | 1.6 | 500 | 90 | Δ |
| 2 | NPPDC | 44 min. | None | 1.5 | 600 | 88 | Δ |
| 3 | LP | 13 hr. | Oxalic acid | 1.1 | 1,100 | 92 | X |
| 4 | AIBN | 32 hr. | Tartaric acid | 1.5 | 1,250 | 90 | X |
| 5 | AP | 32 hr. | Citric acid | 1.3 | 1,500 | 91 | X |
| 6 | IPPDC | 35 min. | Acetic acid | 1.5 | 750 | 89 | X |
| 7 | EHPDC | 51 min. | Sulfuric acid | 1.7 | 800 | 92 | X |

Explanation of Abbreviations in Tables 1 and 2

MSPDC: Di-miristyl peroxydicarbonate
IPPDC: Di-isopropyl peroxydicarbonate
NPPDC: Di-n-propyl peroxydicarbonate
EHPDC: Di(2-ethylhexyl) peroxydicarbonate
EEPDC: Di(2-ethoxyethyl) peroxydicarbonate
MIPPDC: Di(methoxyisopropyl) peroxydicarbonate
LP: Lauroyl peroxide
AIBN: Azobisisobutyronitrile
AP: Acetyl peroxide According to the process of producing PVAc of the present invention, the amount of soluble matters is decreased in a waste liquid generated by saponification of PVAc, the amount of insoluble matters is decreased in a solvent for preparing the solution of PVA obtained by saponification of PVAc, the transparency of the solution of PVA obtained by saponification of PVAc is improved, and the odor of PVA obtained by saponification of PVAc is decreased.

What is claimed is:

1. A process of producing a vinyl acetate polymer by homopolymerization of a vinyl acetate monomer or copolymerization of a vinyl acetate monomer and another copolymerizable comonomer, wherein a polymerization initiator is an organic peroxide having a half life at 60° C. of 10 to 110 minutes, and a polymerization liquid contains at least one carboxylic acid or its salt, said carboxylic acid being selected from the group consisting of a hydroxycarboxylic acid and a polycarboxylic acid.

2. The process of producing a vinyl acetate polymer according to claim 1, wherein the organic peroxide is a peroxydicarbonate.

3. The process of producing a vinyl acetate polymer according to claim 1 or 2, wherein the carboxylic acid compound is a hydroxypolycarboxylic acid.

* * * * *